(12) United States Patent
Harada et al.

(10) Patent No.: US 9,136,532 B2
(45) Date of Patent: *Sep. 15, 2015

(54) ACTIVE MATERIAL FOR BATTERY, NONAQUEOUS ELECTROLYTE BATTERY, AND BATTERY PACK

(71) Applicants: Yasuhiro Harada, Yokohama (JP); Norio Takami, Yokohama (JP); Hiroki Inagaki, Yokohama (JP)

(72) Inventors: Yasuhiro Harada, Yokohama (JP); Norio Takami, Yokohama (JP); Hiroki Inagaki, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/690,586

(22) Filed: Nov. 30, 2012

(65) Prior Publication Data

US 2013/0209863 A1 Aug. 15, 2013

(30) Foreign Application Priority Data

Feb. 9, 2012 (JP) ................................. 2012-026568

(51) Int. Cl.
*H01M 4/485* (2010.01)
*H01M 4/48* (2010.01)
*C01G 33/00* (2006.01)
*H01M 10/052* (2010.01)

(52) U.S. Cl.
CPC .............. *H01M 4/485* (2013.01); *C01G 33/00* (2013.01); *C01G 33/006* (2013.01); *H01M 4/483* (2013.01); *C01P 2002/76* (2013.01); *C01P 2002/77* (2013.01); *C01P 2006/12* (2013.01); *C01P 2006/40* (2013.01); *H01M 10/052* (2013.01); *Y02E 60/122* (2013.01)

(58) Field of Classification Search
None
See application file for complete search history.

(56) References Cited

U.S. PATENT DOCUMENTS

| | | | |
|---|---|---|---|
| 2008/0113264 A1 | 5/2008 | Inagaki et al. | |
| 2008/0118837 A1* | 5/2008 | Shirane et al. | 429/221 |
| 2009/0065738 A1* | 3/2009 | Weidner et al. | 252/182.33 |
| 2009/0081551 A1* | 3/2009 | Hoshina et al. | 429/231.95 |

(Continued)

FOREIGN PATENT DOCUMENTS

| | | |
|---|---|---|
| CN | 101179140 A | 5/2008 |
| JP | 2005-100771 | 4/2005 |

(Continued)

OTHER PUBLICATIONS

Han et al. (Chem. Mater. 2011, 23, 3404-3407).*

(Continued)

*Primary Examiner* — Carlos Barcena
*Assistant Examiner* — Wojciech Haske
(74) *Attorney, Agent, or Firm* — Oblon, McClelland, Maier & Neustadt, L.L.P.

(57) ABSTRACT

According to one embodiment, there is provided a active material for a battery including a complex oxide containing niobium and titanium. A ratio $M_{Nb}/M_{Ti}$ of a mole of niobium $M_{Nb}$ to a mole of titanium $M_{Ti}$ in the active material satisfies either the following equation (I) or (II).

$$0.5 \leq M_{Nb}/M_{Ti} < 2 \qquad (I)$$

$$2 < M_{Nb}/M_{Ti} < 5 \qquad (II)$$

18 Claims, 6 Drawing Sheets

(56) References Cited

U.S. PATENT DOCUMENTS

| | | | |
|---|---|---|---|
| 2011/0206991 A1 | 8/2011 | Nakahara et al. | |
| 2012/0052401 A1* | 3/2012 | Goodenough et al. | 429/341 |
| 2012/0107692 A1 | 5/2012 | Harada et al. | |
| 2012/0244442 A1 | 9/2012 | Harada et al. | |

FOREIGN PATENT DOCUMENTS

| | | |
|---|---|---|
| JP | 2008-91079 | 4/2008 |
| JP | 2008-159399 A | 7/2008 |
| JP | 2010-287496 | 12/2010 |
| JP | 2011-173761 | 9/2011 |
| WO | WO 2012/016185 A2 | 2/2012 |

OTHER PUBLICATIONS

Harada et al. JP 2010-287496 A, machine translation.*
C.M Reich et al. "Niobia Based Rutile Materials as SOFC Anodes", Fuel Cells 2001, 1,No. 3-4, pp. 249-255.
Madeleine Gasperin, "Affinement de la structure de $TiNb_2O_7$ et repartition des cations", Journal of Solid State Chemistry 53 (1984), pp. 144-147.
Office Action issued Jan. 27, 2014 in Korean Application No. 10-2012-95336 (With English Translation).
J. F. Colin, et al., "Lithium Insertion in an Oriented Nanoporous Oxide with a Tunnel Structure: $Ti_2Nb_2O_9$", Chem. Mater., vol. 20, 2008, pp. 1534-1540.
Koichi Inoue, et al., "Ion exchanged potassium titanoniobate as photocatalyst under visible light", J. Electroceram, vol. 24, 2010, pp. 110-114.
Office Action issued Aug. 19, 2014 in Japanese Patent Application No. 2012-026568 (with English language translation).
U.S. Appl. No. 14/202,903, filed Mar. 10, 2014, Inagaki, et al.
Office Action issued Oct. 10, 2014, in Chinese Patent Application No. 201210402325.3 (with English-language Translation).
Jian-Tao Han, et al., 3-V Full Cell Performance of Anode Framework $TiNb_2O_7$/Spinel $LiNi_{0.5}Mn_{1.5}O_4$.
Office Action issued Feb. 2, 2015 in Korean Patent Application No. 10-2012-95336 (with English language translation).
J.-F. Colin., et al, "New titanoniobates $(Li,H)_2TiNbO_5$ and $(Li,H)_3TiNbO_5$: synthesis, structure and properties" Journal of Materials Chemistry, vol. 18, 2008, pp. 3121-3128.
Office Action issued Apr. 9, 2015, in corresponding Japanese Patent Application No. 2012-026568 (with English-language Translation).
J.-F. Colin et al., Lithium Insertion in an Oriented Nanoporous Oxide with a Tunnel Structure: $Ti_2NB_2-O_{91}$, Chem. Mater. 2008, 20, 1534-1540.
J.-F. Colin et al., "A Novel Layered Titanoniobate $LiTiNbO_5$: Topotactic Synthesis and Electrochemistry Versus Lithium," Inorg. Chem. 2006, vol. 45, 7217-7223.
Japanese Office Action issued Jun. 16, 2015, in corresponding Japanese Patent Application No. 2014-214041 (with English-language Translation).

* cited by examiner

US 9,136,532 B2

ACTIVE MATERIAL FOR BATTERY, NONAQUEOUS ELECTROLYTE BATTERY, AND BATTERY PACK

CROSS-REFERENCE TO RELATED APPLICATIONS

This application is based upon and claims the benefit of priority from Japanese Patent Application No. 2012-026568, filed Feb. 9, 2012, the entire contents of which are incorporated herein by reference.

FIELD

Embodiments described herein relate generally to an active material for a battery, a nonaqueous electrolyte battery and a battery pack.

BACKGROUND

A nonaqueous electrolyte battery can be used as power sources for hybrid vehicles and electric vehicles, and also, as stationary rechargeable batteries. Such a use requires that the nonaqueous electrolyte battery have such performances as rapid charge/discharge performance and long-term reliability. However, currently applicable batteries using a carbonaceous material as the negative electrode active material have inferior rapid charge/discharge performance. In light of this, a battery using a metal complex oxide as the negative electrode active material has been developed. Among these developed batteries, batteries using a complex oxide containing titanium have the advantage that they have excellent rapid charge/discharge performance and also a long life.

When a battery is rapidly chargeable/dischargeable, the time required for charging the battery can be outstandingly shortened. Further, the power performance of a hybrid vehicle can be improved. Moreover, power regenerative energy can be efficiently recovered. Thus, it is desired to improve the rapid charge/discharge performance.

On the other hand, a complex oxide containing titanium has a higher potential relative to metallic lithium than a carbonaceous material. Further, the complex oxide has a lower capacity per weight than a carbonaceous material. Thus, a battery using the complex oxide containing titanium has the problem that it has a lower energy density than a battery using a carbonaceous material.

DETAILED DESCRIPTION

In general, according to one embodiment, there is provided an active material for a battery including a complex oxide containing niobium and titanium. A ratio $M_{Nb}/M_{Ti}$ of a mole of niobium $M_{Nb}$ to a mole of titanium $M_{Ti}$ in the active material satisfies either the following equation (I) or (II).

$$0.5 \leq M_{Nb}/M_{Ti} < 2 \quad (I)$$

$$2 < M_{Nb}/M_{Ti} \leq 5 \quad (II)$$

First Embodiment

In a first embodiment, an active material for a battery comprising a complex oxide containing niobium and titanium is provided. This active material has a particle form and is typically used in a powder form. This active material can be used in a nonaqueous electrolyte secondary battery and is typically used in a negative electrode.

In the active material, a ratio $M_{Nb}/M_{Ti}$ of a mole of niobium $M_{Nb}$ to a mole of titanium $M_{Ti}$ satisfies either the following equations (I) or (II).

$$0.5 \leq M_{Nb}/M_{Ti} < 2 \quad (I)$$

$$2 < M_{Nb}/M_{Ti} \leq 5 \quad (II)$$

The active material in this embodiment is constituted of a complex oxide mainly containing niobium and titanium. The active material may only include a complex oxide containing niobium and titanium. Alternatively, the active material may include titanium oxide such as titanium dioxide in addition to the complex oxide containing niobium and titanium. When the active material includes titanium oxide, the ratio $M_{Nb}/M_{Ti}$ is calculated from the moles of niobium and titanium contained in the whole active material.

The complex oxide containing niobium and titanium primarily has a monoclinic crystal structure. As its example, the crystal structure of $Nb_2TiO_7$ is shown in FIGS. 1 and 2 schematically.

Figure 1:
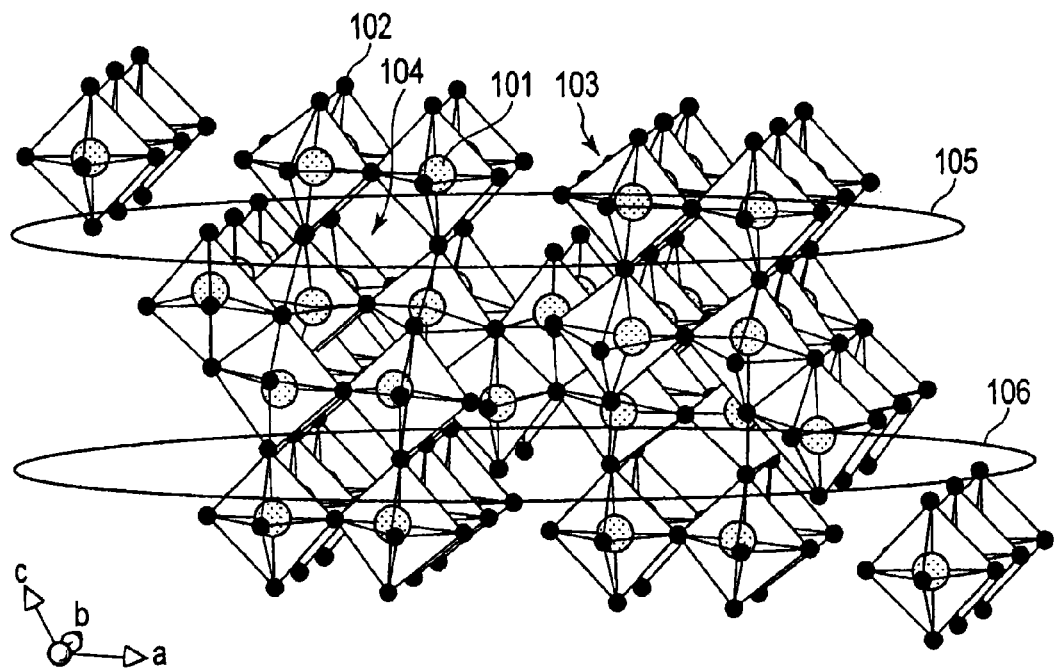
FIG. 1 is a typical view showing the crystal structure of $Nb_2TiO_7$.

As shown in FIG. 1, a metal ion 101 and an oxide ion 102 constitute a skeleton structure 103 in the crystal structure of $Nb_2TiO_7$. As the metal ion 101, Nb ions and Ti ions are arranged at random in a ratio of Nb:Ti=2:1. These skeleton structures 103 are three-dimensionally and alternately arranged, and thus, a void 104 exists between the skeleton structures 103. This void 104 is able to serve as a host into which lithium ions are inserted.

In the regions 105 and 106, lithium ions can transfer in two directions, [100] direction and [010] direction. The regions 105 and 106 therefore function as a two-dimensional channel for lithium ions.

Figure 2:
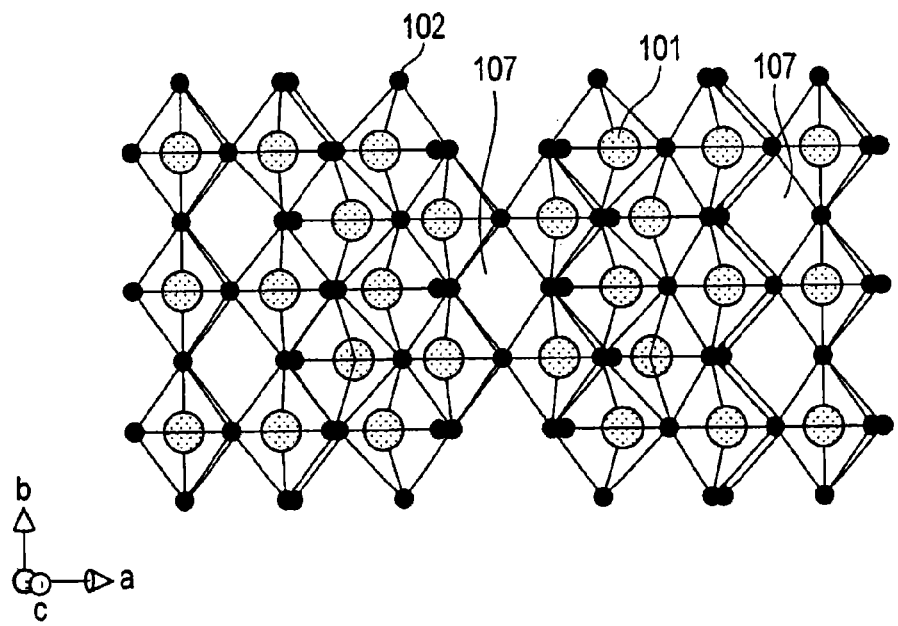
FIG. 2 is a typical view of the crystal structure of FIG. 1 as viewed from other direction.

As shown in FIG. 2, a tunnel-like void (tunnel 107) exist in the [001] direction in the crystal structure of $Nb_2TiO_7$. This tunnel 107 is a transfer path of lithium ions in the [001] direction. Because the tunnel 107 connects the region 105 with the region 106, lithium ions can move between these regions 105 and 106.

As mentioned above, the crystal structure of the complex oxide containing niobium and titanium which is represented by the formula $Nb_2TiO_7$ has a large space where lithium ions can be inserted. Further it is structurally stable. Moreover, the crystal structure of the complex oxide is provided with a two-dimensional channel in which lithium ions can be rapidly diffused and with a path extending in the [001] direction to connect these channels with each other. From these results, the crystal structure has a substantially large space where lithium ions can be inserted and has high lithium ion insertion/release ability.

The complex oxide containing niobium and titanium primarily has the symmetry of the space group C2/m, though not limited to this. Further, at least a part of the complex oxide preferably has a crystal structure having the atomic coordinate described in M. Gasperin, Journal of Solid-State Chemistry 53, pp. 144-147 (1984).

In the active material of the embodiment, the ratio $M_{Nb}/M_{Ti}$ is made to fall in the above range, thereby enabling improvements in rapid charge/discharge performance and energy density as will be mentioned later. The ratio $M_{Nb}/M_{Ti}$ is preferably in a range from 1.0 to 1.99 or in a range from 2.01 to 5.0, and more preferably in a range from 1.8 to 1.9 or in a range from 2.1 to 3.0.

The ratio $M_{Nb}/M_{Ti}$ in the active material can be measured by the induction coupling plasma (ICP) analytical method. The active material contained as the electrode material in a battery can be measured in the following manner. First, a layer (for example, an active material layer which will be explained later) in which the active material is contained is peeled from an electrode substrate such as a metal foil. The active material layer can be peeled, for example, by applying an ultrasonic wave to the electrode substrate in a solvent. Next, the active material layer is heated in the air for a short time (for example, at 500° C. for 1 hour). Other components such as a binder and a conductive agent are removed by heating. On the other hand, the mole ratios of elements constituting the active material are not changed after heating. The residue after heating is dissolved in an acid to prepare a measuring sample. This measuring sample is subjected to ICP analysis.

As mentioned above, the complex oxide containing niobium and titanium has a large effective space into which lithium ions can be inserted in the crystal structure. Further, lithium ion insertion/release property of the complex oxide containing niobium and titanium is high. Therefore, the use of an active material containing such a complex oxide ensures that a battery having a high capacity and a rapid charge/discharge performance (i.e. discharge rate performance) can be provided.

Moreover, according to the embodiment, when the ratio $M_{Nb}/M_{Ti}$ in the active material is less than 2, the complex oxide containing niobium and titanium can be a solid solution in which a part of niobium in the crystal lattice is substituted with titanium. The active material may be primarily constituted of such as solid solution. When the ratio $M_{Nb}/M_{Ti}$ in the active material is less than 2, there is the case where excess titanium precipitates as titanium dioxide. In this case, the active material includes a first phase constituted of the above solid solution and a second phase constituted of titanium dioxide. Further, the active material may include a first phase constituted of $Nb_2TiO_7$ as the complex oxide containing niobium and titanium and a second phase constituted of titanium dioxide. Precipitated titanium dioxide has a crystal structure such as rutile or anatase structure. Whether or not the second phase constituted of titanium dioxide is contained in the active material can be detected by the powder X-ray diffraction (XRD) method.

Titanium dioxide is reduced from tetravalent to trivalent by insertion of lithium ion. The coexistence of such a titanium dioxide with the complex oxide containing niobium and titanium improves the electronic conductivity of the active material. Further, a solid solution as mentioned above gives rise to oxygen defect and/or electron-hole for keeping charge neutrality, thereby improving electronic conductivity.

On the other hand, according to the embodiment, when the ratio $M_{Nb}/M_{Ti}$ in the active material exceeds 2, a part of titanium sites of the complex oxide is substituted with niobium. When niobium is inserted into the titanium sites, a part of titanium is reduced for keeping charge neutrality, and therefore, the electronic conductivity of the complex oxide is improved while keeping the crystal structure. Thus, the electronic conductivity of the active material is improved.

According to the embodiment, when the ratio $M_{Nb}/M_{Ti}$ is set to a value other than 2 and a crystal in which charge neutrality is not kept is contained, the electronic conductivity of the active material is improved. The rapid charge/discharge performance of a battery can be improved by using such an active material having high electronic conductivity. When the ratio $M_{Nb}/M_{Ti}$ is in a range from 1.8 to 1.99 or in a range from 2.01 to 3.0, more excellent rapid charge/discharge performance is obtained.

Moreover, since the active material has high electronic conductivity, the amount of a conductive agent to be used for producing a battery can be reduced. Because $Nb_2TiO_7$ has low electronic conductivity, a conventional battery is improved in rapid charge/discharge performance by adding a large amount of a conductive agent such as carbon. However, the amount of a conductive agent can be reduced by using the active material of the embodiment. Accordingly, the weight of a battery can be reduced, with the result that energy density can be improved.

Moreover, when the ratio $M_{Nb}/M_{Ti}$ is less than 2, the following advantage is obtained. When lithium ions are inserted into a void 104 as shown in FIG. 1, a metal ion 101 constituting the skeleton is reduced. Specifically, titanium ions are reduced from tetravalent to trivalent and niobium ions are reduced from pentavalent to trivalent. This keeps the electric neutrality of the crystal. However, the inventors have found that there are niobium ions which are not reduced although lithium ions are inserted. It may be inferred that because repulsion between lithium ions is stronger in the crystal with increase in the amount of lithium ions inserted into the crystal, it becomes difficult for lithium ions to be inserted.

However, the amount of unreduced niobium can be decreased by decreasing the ratio $M_{Nb}/M_{Ti}$ to less than 2. Unreduced niobium does not contribute to the capacity of a battery. Therefore, the weight of the battery can be reduced while keeping the capacity of the battery. As a result, energy density per weight can be improved. Further, because the amount of expensive niobium can be reduced, the cost of the battery can be reduced.

On the other hand, when the ratio $M_{Nb}/M_{Ti}$ exceeds 2, a complex oxide having high crystallinity can be obtained. Because a complex oxide having high crystallinity has high ionic conductivity, the rapid charge/discharge performance of a battery can be improved. Also, such a complex oxide has the advantage of a high effective capacity due to high crystallinity. Though the theoretical capacity of $Nb_2TiO_7$ is 380 mAh/g or more, the effective capacity of $Nb_2TiO_7$ is about 260 mAh/g. However, the effective capacity can be increased by increasing the ratio $M_{Nb}/M_{Ti}$ to a value exceeding 2, and therefore, the energy density of the battery can be increased. When the ratio $M_{Nb}/M_{Ti}$ is in a range from 2.1 to 3.0, a higher effective capacity is obtained.

In order to improve the crystallinity of $Nb_2TiO_7$, it is necessary to sinter the raw material at a temperature as high as about 1400° C. when synthesizing a crystal. However, when the ratio $M_{Nb}/M_{Ti}$ is designed to be a value exceeding 2, a complex oxide having high crystallinity can be obtained even if the raw material is sintered at a temperature as low as about 1000° C. Therefore, the production cost can be reduced.

When the ratio $M_{Nb}/M_{Ti}$ is too small, a phase constituted of titanium dioxide is dominant in the active material. In this case, the capacity and energy density of a battery are significantly deteriorated. When the ratio $M_{Nb}/M_{Ti}$ is too large, the capacity and rapid charge/discharge performance of a battery tend to deteriorate. This reason is that when niobium excessively exists, the capacity energy density per weight is deteriorated because there is an upper limit to the amount of lithium which can be inserted into the crystal structure. Moreover, the bondability between an oxide ion and pentavalent niobium constituting a skeleton structure is higher than that between the oxide ion and tetravalent titanium. This makes the skeleton structure too firm. Therefore, it is considered that the diffusibility of lithium ions is deteriorated.

The complex oxide containing niobium and titanium is preferably one represented by the formula $Li_xNb_yTiO_{\{(5y+4)/2\}+\delta}$ (wherein $0 \leq x \leq 9$, $0.5 \leq y < 2$ or $2 < y < 4$, and $-0.5 \leq \delta \leq 0.5$). Such a complex oxide has single titanium which can be reduced from tetravalent to trivalent and has less than 4 niobiums which can be reduced from pentavalent to trivalent in each chemical formula. Therefore, theoretically, a maximum of less than 9 lithium ions can be inserted into this complex oxide. Because this improves electrode density, the complex oxide has the advantage that particularly it can increase the energy density per volume. On the other hand, when y is less than 2, the weight per lattice can be reduced because the amount of niobium is small. Therefore, the complex oxide has the advantage that the weight energy density relative to the amount of lithium to be inserted can be improved. Moreover, the amount of niobium is reduced, enabling cost reduction.

In the above equation, δ varies depending on the reduced state of the complex oxide and degree of substitution of titanium for niobium sites. When δ is less than −0.5 (for example, −0.6), there may be a possibility that niobium is reduced in advance, resulting in deteriorated electrode performance. When is equal or less than +0.5, it is within the range of measurement error.

In one embodiment, the active material of the embodiment includes a first phase constituted of a complex oxide represented by the formula $Li_xNb_yTiO_{\{(5y+4)/2\}+\delta}$ (wherein $0 \leq x \leq 9$, $0.5 \leq y < 2$ or $2 < y < 4$, and $-0.5 \leq \delta \leq 0.5$) and a second phase constituted of titanium dioxide. Such an active material is desirable because titanium dioxide is made to have electron conductivity by insertion of lithium, with the result that the resistance of the electrode decreases.

The state of titanium in the active material can be confirmed by powder X-ray diffraction (XRD). Whether or not titanium forms a substitutional solid solution in the crystal structure can be determined by observation of the crystal phase using XRD. Specifically, the crystal phase is subjected to XRD measurement to determine as to whether or not a second phase exists and to determine the variation of the lattice constant of the complex oxide. The variation of the lattice constant reflects ion radius of an element which is added (that is, titanium). However, when the amount of the additive element is small, there is the case where XRD cannot determine. In this case, the crystal structure is determined by observation using a transmission electron microscope (TEM) or by measurement using electronic probe microanalysis (EPMA). The distribution condition of titanium can be found by these methods. When titanium is uniformly distributed in the active material, the active material is considered to mainly contain a phase constituted of the complex oxide. When titanium is segregated in the active material, the active material is considered to contain a second phase constituted of titanium dioxide together with the first phase constituted of the complex oxide.

The measurement using XRD can be made in the following manner. First, the active material is ground to prepare a sample having an average particle diameter of about 5 μm. The average particle diameter can be found by the laser diffraction method. The obtained sample is filled in a 0.2 mm deep holder part formed on a glass sample plate. Then, a separate glass plate is pressed against the sample from the outside to flatten the surface of the filled sample. Much care should be taken to fill the holder part with the right amount of the sample such that generation of cracks, voids and irregularities on the sample filled is avoided. Further, much care is necessary to press the glass plate with sufficient pressure. Then, the glass plate filled with the sample is set to a powder X-ray diffractometer to obtain a diffraction pattern using Cu—Kα rays.

When the sample has high orientation, there is the possibility of the deviation of peak position and variation in intensity ratio depending on the way of filling the sample. Such a sample having significantly high orientation is measured using a capillary. Specifically, the sample is filled in the capillary, which is then mounted on a rotary sample table to measure. Such a measuring method can reduce the influence of orientation.

The active material contained as the electrode material in a battery can be measured in the following manner. First, the active material is put into the state in which lithium ions are perfectly released from the complex oxide containing niobium and titanium. When the active material is used in, for example, the negative electrode, the battery is put into a perfectly discharged state. This process allows observation of the crystal state of the active material. However, there is the case where residual lithium ions exist even in such a discharged state. Next, the battery is dismounted in a glove box filled with argon to take out the electrode. The taken-out electrode is washed with an adequate solvent. For example, ethylmethyl carbonate or the like may be used as the solvent. The washed electrode is cut into approximately the same the size of the holder of the powder X-ray diffractometer to prepare a measuring sample. The sample is directly applied to the glass holder to be measured. At this time, the position of a peak derived from the electrode substrate such as a metal foil is measured in advance. Also, the peaks derived from other components such as a conductive agent and a binder are measured in advance. When the peak derived from the substrate is overlapped to the peak derived from the active material, it is desirable to peel off from the substrate a layer (for example, the active material layer which will be explained later) containing the active material prior to measurement. This is to separate overlapping peaks from each other when measuring peak intensity quantitatively. The active material layer can be peeled off by applying ultrasonic wave to the electrode substrate in a solvent. The active material layer is sealed in a capillary, which is mounted on a rotary sample table to be measured. The XRD pattern of the active material can be obtained while the influence of orientation is decreased by such a method.

The obtained XRD pattern is analyzed by the Rietveld method. In the Rietveld method, a diffraction pattern is calculated from a crystal structure model estimated in advance. All of these calculated values and actual values can be analyzed by fitting working to determine parameters (for example, lattice constant, atomic coordination and occupation) relating to the crystal structure with high accuracy. This allows the investigation of the feature of the crystal structure of a synthesized oxide. Further, a state of a two-phase coexistence with a compound having other crystal structure such as titanium dioxide can also be investigated.

The active material explained above can be produced by the following methods.

First, starting raw materials are blended. As these starting raw materials, an oxide containing lithium, titanium, and niobium or salt of them is used. The salt used as the starting raw material is preferably a salt, such as a carbonate or nitrate, which is decomposed at a relatively lower temperature to give an oxide.

The starting raw materials are mixed so that the proportion of the mole of niobium is 0.5 or more and less than 5 (excluding 2) relative to the mole of titanium. Even if a crystal is synthesized in such a proportion that the charge of the crystal is not kept neutral, it is possible to obtain a mixture in which a complex oxide phase (first phase) keeping a monoclinic crystal structure (e.g. $Li_xNb_2TiO_7$) in a large part thereof and a titanium dioxide phase (second phase) coexist.

Next, the obtained mixture is ground as uniformly as possible. Then, the ground mixture is sintered. The sintering is performed at a temperature range from 500 to 1450° C. for a total of 10 to 40 hours. Consequently, an active material in which the proportion of the mole of niobium to the mole of titanium is 0.5 or more and less than 5 (excluding 2) and which includes a complex oxide containing niobium and titanium can be obtained.

In the above method, starting raw materials containing no lithium may be used to synthesize an active material containing no lithium. Lithium ions are inserted into such an active material by charging the battery.

The complex oxide containing niobium and titanium has a particle form. The average particle diameter of the complex oxide can be varied corresponding to desired battery performance, without any particular limitation. The particles may have a BET specific surface area of, though not limited to, 0.1 $m^2/g$ or more and less than 100 $m^2/g$. When the BET specific surface area is 0.1 $m^2/g$ or more, the contact area between the complex oxide and electrolytic solution can be secured. In this case, the rapid charge/discharge performance is improved and charge time is shortened. On the other hand, if the BET specific surface area is less than 100 $m^2/g$, the reactivity between the complex oxide and electrolytic solution does not become too high. Accordingly, the cycle performance of the battery can be improved. Further, a slurry containing the active material is easily applied when an electrode is produced.

The BET specific surface area means the specific surface area measured by the BET method. In this method, a molecule of which the adsorption occupying area is known is used to measure the specific surface area of particles. First, such a molecule is made to adsorb to the surface of the particle at the temperature of liquid nitrogen. Then, the specific surface area of the particle is calculated from the quantity of the molecule to be adsorbed to the particle. In the BET method, inert gas is physically adsorbed in a low-temperature and low-humidity environment. The BET method is a method obtained by extending the Langmuir theory which is a monomolecular adsorption theory to multilayer adsorption and is the most famous as the calculation method of specific surface area.

According to the above embodiment, an active material for a battery which can attain a battery having an excellent rapid charge/discharge performance and a high energy density can be provided.

Second Embodiment

In this second embodiment, a nonaqueous electrolyte battery is provided. The nonaqueous electrolyte battery comprises a negative electrode containing the active material according to the first embodiment, a positive electrode, a nonaqueous electrolyte, a separator and a container.

Figure 3:
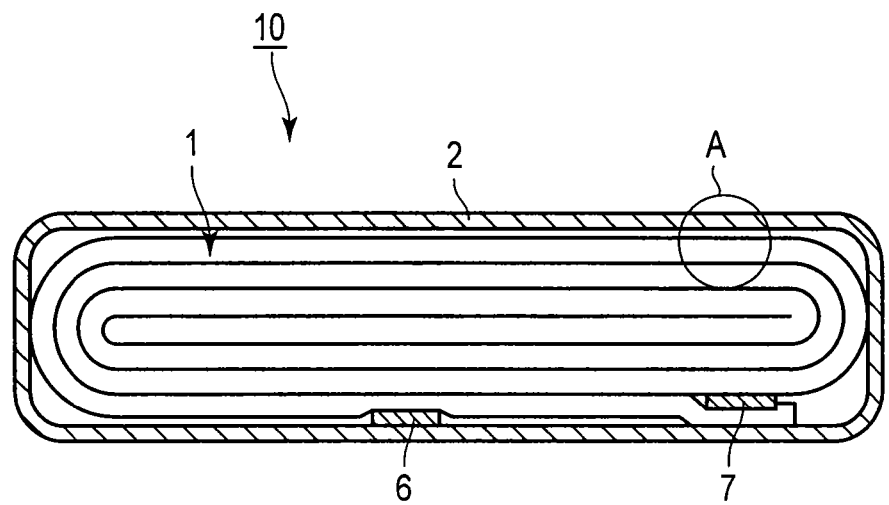
FIG. 3 is a sectional view of a flat-type nonaqueous electrolyte battery according to a second embodiment.
Figure 4:
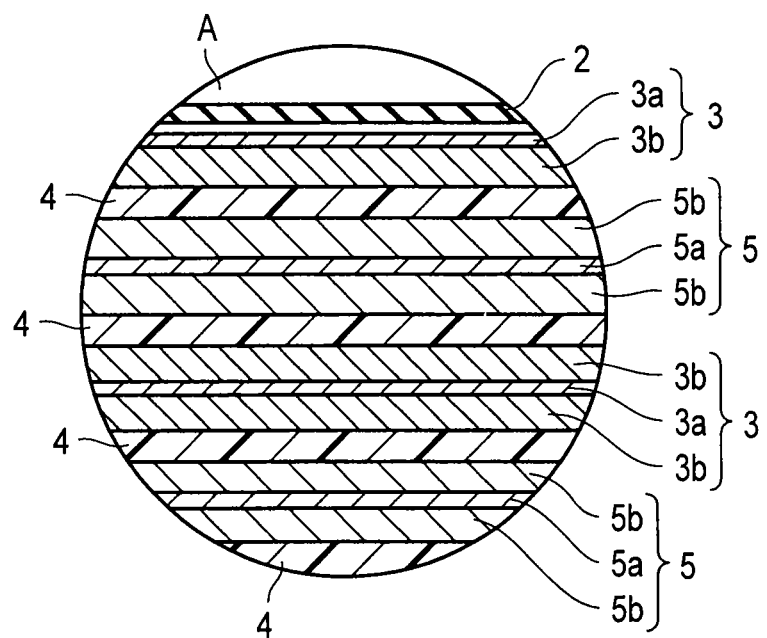
FIG. 4 is an enlarged sectional view of part A in FIG. 3.

A flat-type nonaqueous electrolyte secondary battery is shown as an example of the nonaqueous electrolyte battery in FIGS. 3 and 4. FIG. 3 is a sectional view of a battery 10, and FIG. 4 is an enlarged sectional view of part A in FIG. 3. Each drawing is a diagram for explaining the embodiment and for promoting the understanding of the embodiment. Though there are parts different from an actual battery in shape, dimension, ratio or the like, these structural designs may be properly changed taking the following explanations and known technologies into consideration.

The battery 10 includes a bag-shaped container 2, and a flat-type wound electrode group 1 accommodated in the container 2. A nonaqueous electrolyte (not shown) is included in the container 2. The wound electrode group 1 is impregnated with the nonaqueous electrolyte.

The wound electrode group 1 includes a negative electrode 3, a separator 4, a positive electrode 5. As shown in FIG. 4, the negative electrode 3, separator 4, positive electrode 5, and separator 4 are laminated in this order to produce a laminate, the laminate being then spirally wounded such that the negative electrode is positioned on the outermost periphery. The wounded laminate is pressed under heating to produce a flat-type wound electrode group 1.

The negative electrode 3 includes a negative electrode current collector 3a and a negative electrode active material layer 3b. The part of the negative electrode 3 positioned on the outermost periphery is provided with the negative electrode active material layer 3b only on one internal surface of the negative electrode current collector 3a as shown in FIG. 4. Other part of the negative electrode 3 is provided with the negative electrode active material layer 3b on each surface of the negative electrode current collector 3a. The negative electrode active material layer 3b contains a negative electrode active material and, optionally, a conductive agent and a binder.

The positive electrode 5 includes a positive electrode current collector 5a and a positive electrode active material layer 5b. The positive electrode active material layer 5b is formed on each surface of the positive electrode current collector 5a. The positive electrode active material layer 5b includes a positive electrode active material and, optionally, a conductive agent and a binder.

As shown in FIG. 3, the negative electrode terminal 6 is connected with the negative electrode current collector 3a of the outermost peripheral negative electrode 3, and the positive electrode terminal 7 is connected with the positive electrode current collector 5a of the inside positive electrode 5. These negative electrode terminal 6 and positive electrode terminal 7 are extended to outside through an opening of the container 2. The nonaqueous electrolyte is injected into the container 2 from the opening. The opening of the container 2 is heat-sealed in the state that the negative electrode terminal 6 and positive electrode terminal 7 are sandwiched, thereby the wound electrode group 1 and nonaqueous electrolyte are completely sealed.

The negative electrode terminal 6 is made of a material which is electrochemically stable at the potential which insertion/release of lithium ion occurs in the negative electrode active material and which has conductivity. Specific examples of the material for the negative electrode terminal 6 include Cu, Ni, stainless and aluminum. The negative electrode terminal 6 is preferably made of the same material as the negative electrode current collector 3a to reduce the contact resistance with the negative electrode current collector 3a.

The positive electrode terminal 7 is made of a material which is electrochemically stable in the potential range from 3 V to 5 V relative to metallic lithium and which has conductivity. Specifically, the positive electrode terminal 7 may be made of aluminum or an aluminum alloy containing at least one element such as Mg, Ti, Zn, Mn, Fe, Cu or Si. The positive electrode terminal 7 is preferably made of the same material as the positive electrode current collector 5a to reduce the contact resistance with the positive electrode current collector 5a.

The active material explained in the first embodiment is used as the negative electrode active material contained in the negative electrode active material layer 3b. This enables the production of a nonaqueous electrolyte battery having excellent rapid charge/discharge performance and a high energy density. Though the negative electrode active material may be constituted only of the active material explained in the first embodiment, it may further contain other oxides. Examples of the other oxides include titanium dioxide having anatase structure ($TiO_2$), lithium titanate having rhamsdelite structure (e.g. $Li_2Ti_3O_7$) and lithium titanate having spinel structure (e.g. $Li_4Ti_5O_{12}$). These other oxides are preferably contained in a ratio of 50% or less based on the total mass of the negative electrode active material. When the negative electrode active material contains oxides other than the active material according to the first embodiment, the ratio $M_{Nb}/M_{Ti}$ of the mole of niobium $M_{Nb}$ to the mole of titanium $M_{Ti}$ in the whole negative electrode active material is preferably 0.5 or more and less than 5 (excluding 2).

The conductive agent contained in the negative electrode active material layer 3b is blended to improve current-collecting performance and to suppress the contact resistance between the active material and the negative electrode current collector 3a. Examples of the conductive agent include carbonaceous materials such as acetylene black, carbon black, or graphite.

The binder is blended to fill gaps of the dispersed negative electrode active materials and also to bind the active material with the current collector. Examples of the binder include polytetrafluoroethylene (PTFE), polyvinylidene fluoride (PVdF), fluorine-based rubber, and styrene-butadiene rubber.

In the negative electrode layer 3b, the contents of the negative electrode active material, conductive agent, and binder are preferably in the range from 68% by mass to 96% by mass, from 2% by mass to 30% by mass and from 2% by mass to 30% by mass, respectively. When the amount of the conductive agent is 2% by mass or more, the current collecting performance of the negative electrode layer can be improved. Further, when the amount of the binder is 2% by mass or more, the binding strength between the negative electrode layer and the current collector is satisfactory and excellent cycle performance can be expected. On the other hand, in order to improve capacity, the contents of the conductive agent and the binder are preferably 30% by mass or less, respectively.

As the negative electrode current collector, a material is used which is electrochemically stable at the potential which insertion/release of lithium ion occurs in the negative electrode active material. The current collector is preferably made of Cu, Ni, stainless or aluminum, or an aluminum alloy containing at least one element selected from Mg, Ti, Zn, Mn, Fe, Cu, and Si. The thickness of the negative electrode current collector is preferably 5 μm to 20 μm. When the thickness is in the range, the weight of the current collector can be reduced, while maintaining the strength of the electrode.

The negative electrode may be manufactured, for example, by suspending the negative electrode active material, binder and conductive agent if necessary, in an appropriate solvent to prepare a slurry, by applying this slurry to the surface of the negative electrode current collector and by drying the slurry to form a negative electrode active material layer, followed by pressing.

Alternatively, the negative electrode can be manufactured by mixing the negative electrode active material and binder, and the conductive agent if necessary, forming the mixture into a pellet. The pellet can be used as the negative electrode layer. The pellet is placed on the current collector.

As the positive electrode active material contained in the positive electrode active material layer 5b, for example, oxides or sulfides may be used. Examples of the oxides and sulfides include those into which lithium ion is inserted, for example, manganese dioxide ($MnO_2$), iron oxide, copper oxide, nickel oxide, lithium-manganese complex oxides (e.g. $Li_xMn_2O_4$ or $Li_xMnO_2$), lithium-nickel complex oxides (e.g. $Li_xNiO_2$), lithium-cobalt complex oxides (e.g. $Li_xCoO_2$), lithium-nickel-cobalt complex oxides (e.g. $LiNi_{1-y}Co_yO_2$), lithium-manganese-cobalt complex oxides (e.g. $Li_xMn_yCo_{1-y}O_2$), lithium-manganese-nickel complex oxides having a spinel structure (e.g. $Li_xMn_{2-y}Ni_yO_4$), lithium-phosphorous oxide having an olivine structure (e.g. $Li_xFePO_4$, $Li_xFe_{1-y}Mn_yPO_4$, and $Li_xCoPO_4$), iron sulfate ($Fe_2(SO_4)_3$), vanadium oxide (e.g. $V_2O_5$) and lithium-nickel-cobalt-manganese complex oxide. In the above formula, 0<x≤1, 0<y≤1. As the positive electrode active material, these compounds may be used alone or in combination with other compounds.

Preferable examples of the positive electrode active material include those having a high positive electrode voltage, for example, lithium-manganese complex oxides (e.g. $Li_xMn_2O_4$), lithium-nickel complex oxides (e.g. $Li_xNiO_2$), lithium-cobalt complex oxides (e.g. $Li_xCoO_2$), lithium-nickel-cobalt complex oxides (e.g. $LiNi_{1-y}Co_yO_2$), lithium-manganese-nickel complex oxides having a spinel structure (e.g. $Li_xMn_{2-y}Ni_yO_4$), lithium-manganese-cobalt complex oxides (e.g. $Li_xMn_yCo_{1-y}O_2$), lithium-iron phosphate (e.g. $Li_xFePO_4$) and lithium-nickel-cobalt-manganese complex oxides. In the above formula, 0<x≤1, 0<y≤1.

Examples of a preferred positive electrode active material when the ordinary temperature molten salt is used as the nonaqueous electrolyte of the battery include lithium-iron phosphate, $Li_xVPO_4F$ (0≤x≤1), lithium-manganese complex oxide, lithium-nickel complex oxide, and lithium-nickel-cobalt complex oxide. Since these compounds have low reactivity with an ordinary temperature molten salt, the cycle life can be improved.

The average primary particle diameter of the positive electrode active material is preferably 100 nm to 1 μm. The positive electrode active material having an average primary particle diameter of 100 nm or more is easily handled in the production of the electrode. The positive electrode active material having an average primary particle diameter of 1 μm or less enables smooth progress of diffusion of lithium ions in solid.

The specific surface area of the active material is preferably 0.1 m²/g to 10 m²/g. The positive electrode active material having a specific surface area of 0.1 m²/g or more is capable of securing lithium ion-insertion sites sufficiently. The positive electrode active material having a specific surface area of 10 m²/g or less is easily handled in the production of the electrode and can also secure good charge/discharge cycle performance.

The binder is blended to bind the active material with the current collector. Examples of the binder include a polytetrafluoroethylene (PTFE), polyvinylidene fluoride (PVdF) and fluorine-based rubber.

The conductive agent is blended according to the need to improve the current collecting ability of the active material and to reduce the contact resistance between the active material and the current collector. Examples of the conductive agent include carbonaceous materials such as acetylene black, carbon black, or graphite.

In the positive electrode active material layer 5$b$, the contents of active material and binder are preferably in the range from 80% by mass to 98% by mass and from 2% by mass to 20% by mass, respectively.

When the content of the binder is 2% by mass or more, sufficient electrode strength can be obtained. When the content of the binder is 20% by mass or less, the amount of an insulating material in the electrode can be reduced, making possible to reduce internal resistance.

When the conductive agent is added, the contents of the positive electrode active material, binder and conductive agent are preferably in the range from 77% by mass to 95% by mass, from 2% by mass to 20% by mass and from 3% by mass to 15% by mass, respectively. When the amount of the conductive agent is 3% by mass or more, the aforementioned effect can be obtained. When the amount of the conductive agent is 15% by mass or less, the decomposition of the nonaqueous electrolyte on the surface of the positive electrode conductive agent when the battery is stored under high temperatures can be reduced.

The positive electrode current collector 5$a$ is preferably made of an aluminum foil or aluminum alloy foil containing at least one element selected from Mg, Ti, Zn, Ni, Cr, Mn, Fe, Cu and Si.

The thickness of the aluminum foil or aluminum alloy foil is preferably 5 µm to 20 µm and more preferably 15 µm or less. The purity of the aluminum foil is 99% by mass or more. The content of transition metals such as Fe, Cu, Ni and Cr contained in the aluminum foil or aluminum alloy foil is preferably designed to be 1% by mass or less.

The positive electrode may be manufactured, for example, by suspending the positive electrode active material, binder and conductive agent if necessary, in an appropriate solvent to prepare a slurry, by applying this slurry to the surface of a positive electrode current collector and by drying the slurry to form a positive electrode layer, followed by pressing.

Alternatively, the positive electrode can be manufactured by mixing the positive electrode active material and binder, and the conductive agent if necessary, forming the mixture into a pellet. The pellet can be used as the positive electrode layer. The pellet is placed on the positive electrode current collector.

A liquid nonaqueous electrolyte or a gel-like nonaqueous electrolyte may be used as the nonaqueous electrolyte. The liquid nonaqueous electrolyte is prepared by dissolving an electrolyte in an organic solvent. The gel-like nonaqueous electrolyte is prepared by forming a complex of a liquid electrolyte and a polymer material.

The concentration of the electrolyte in the liquid nonaqueous electrolyte is preferably 0.5 mol/L to 2.5 mol/L.

Examples of the electrolyte include lithium salts such as lithium perchlorate ($LiClO_4$), lithium hexafluorophosphate ($LiPF_6$), lithium tetrafluorophosphate ($LiBF_4$), hexafluoro arsenic lithium ($LiAsF_6$), lithium trifluoromethasulfonate ($LiCF_3SO_3$), and bistrifluoromethylsulfonylimide lithium [$LiN(CF_3SO_2)_2$], or mixtures of these compounds. The electrolyte is preferably one which is difficult to be oxidized at a high potential and $LiPF_6$ is most preferable.

Examples of the organic solvent include cyclic carbonates such as propylene carbonate (PC), ethylene carbonate (EC), and vinylene carbonate; chain carbonates such as diethyl carbonate (DEC), dimethyl carbonate (DMC) and methylethyl carbonate (MEC); cyclic ethers such as tetrahydrofuran (THF), 2-methyltetrahydrofuran (2MeTHF) and dioxolan (DOX); chain ethers such as dimethoxyethane (DME) and diethoxyethane (DEE); γ-butyrolactone (GBL), acetonitrile (AN) and sulfolan (SL). These organic solvents may be used either singly or in combination of two or more.

Examples of the polymer material include a polyvinylidene fluoride (PVdF), polyacrylonitrile (PAN) and polyethylene oxide (PEO).

Alternatively, a ordinary temperature molten salt (ionic melt), polymer solid electrolyte or inorganic solid electrolyte containing lithium ions may be used as the nonaqueous electrolyte.

The ordinary temperature molten salt means compound which can exist in a liquid state at normal temperature (15 to 25° C.) among organic salts constructed by organic cation and anion. Examples of the ordinary temperature molten salt include those which independently exist in a liquid state, those which are put into a liquid state when mixed with an electrolyte, and those which are put into a liquid state when mixed with an organic solvent. The melting point of the ordinary temperature molten salt to be used in a nonaqueous electrolyte battery is generally 25° C. or less. Further, the organic cation generally has a quaternary ammonium skeleton.

The polymer solid electrolyte is prepared by dissolving an electrolyte in a polymer material and by solidifying the mixture.

The inorganic solid electrolyte is a solid material having lithium ion conductivity.

As the separator 4, a porous film made from materials such as polyethylene, polypropylene, cellulose, or polyvinylidene fluoride (PVdF), a synthetic resin nonwoven fabric or the like can be used. A porous film made of polyethylene or polypropylene melts at a certain temperature and can block electric current, and thus it is preferred from the viewpoint of improvement in safety.

As the container 2, a baggy container formed of a laminate film or a metal container is used.

Examples of the shape of the container 2 include a flat type (thin type), angular type, cylinder type, coin type, button type, sheet-type, and lamination-type shapes. The container having a size corresponding to the dimensions of a battery are used. For example, containers for small-sized batteries to be mounted on portable electronic devices and containers for large-sized batteries to be mounted on, for example, two- to four-wheel vehicles are also used.

As the laminate film, a multilayer film prepared by interposing a metal layer between resin layers may be used. The metal layer is preferably formed of an aluminum foil or aluminum alloy foil to reduce the weight of the battery. For example, polymer materials such as polypropylene (PP), polyethylene (PE), nylon or polyethylene terephthalate (PET) may be used for the resin layer. The laminate film can be molded into a desired shape by sealing through thermal fusion. The thickness of the laminate film is preferably 0.5 mm or less, more preferably 0.2 mm or less.

The metal container may be made of aluminum, an aluminum alloy or the like. The aluminum alloy is preferably an alloy containing one or more elements selected from Mg, Zn, and Si. When the alloy contains transition metals such as Fe, Cu, Ni or Cr, the amount of the transition metals is preferably 1% by mass or less. The metal container preferably has a thickness of 1 mm or less, more preferably 0.5 mm or less, still more preferably 0.2 mm or less.

Figure 5:
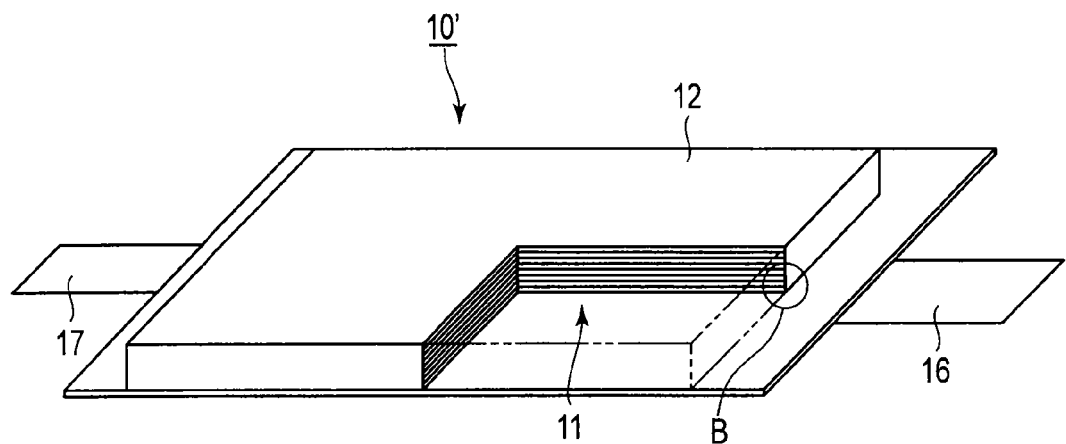
FIG. 5 is partially broken perspective view of another flat-type nonaqueous electrolyte battery according to a second embodiment.
Figure 6:
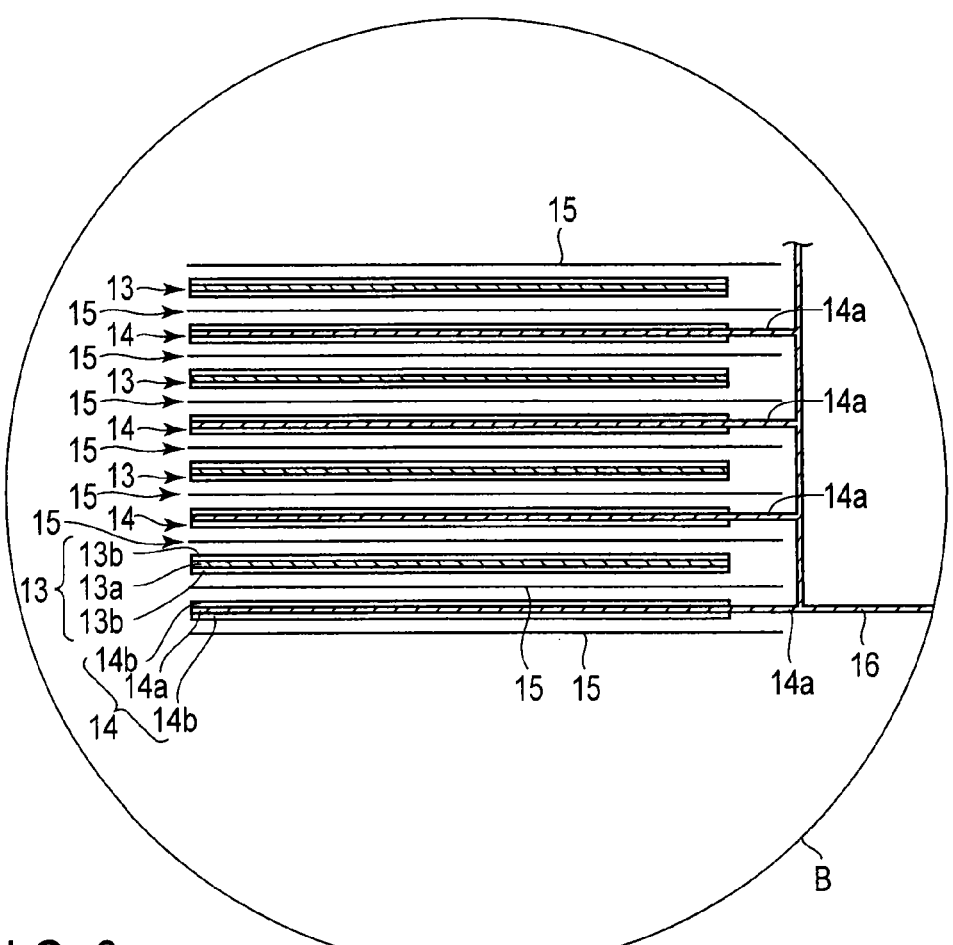
FIG. 6 is an enlarged sectional view of part B in FIG. 5.

FIGS. 5 and 6 show a flat-type nonaqueous electrolyte secondary battery having other shape. FIG. 5 is a partially broken perspective view of a battery 10', and FIG. 6 is an enlarged sectional view of part B in FIG. 5.

A battery 10' includes a baggy container 12 and a lamination-type electrode group 11 accommodated in the container 12, and a nonaqueous electrolyte, a negative electrode terminal 16, and a positive electrode terminal 17. A nonaqueous electrolyte (not shown) is contained in the container 12. The lamination-type electrode group 11 is impregnated with the nonaqueous electrolyte.

The lamination-type electrode group 11 includes a positive electrode 13, a negative electrode 14 and a separator 15. The lamination-type electrode group 11 has, as shown in FIG. 6, a structure in which a positive electrode 13 and a negative electrode 14 are alternately laminated with a separator 15 being interposed therebetween.

A plurality of the positive electrodes 13 are present and they include a positive electrode current collector 13a and a positive electrode layer 13b provided on each surface of the positive electrode current collector 13a. A plurality of the negative electrodes 14 are present and they include the negative electrode current collector 14a and a negative electrode layer 14b provided on each surface of the negative electrode current collector 14a.

One side of the each negative electrode current collectors 14a is protruded from the laminate and connected to the band-shaped negative electrode terminal 16. Similarly, not illustrated, one side of the each positive electrode current collectors 13a is protruded from the laminate at the opposite side which the negative electrode current collector 14a is protruded from the laminate. The positive electrode current collectors 13a are connected to the band-shaped positive electrode terminal 17. The end of the negative electrode terminal 16 is externally drawn out of the container 12. The end of the positive electrode terminal 17 is positioned opposite to the negative electrode terminal 16 and externally drawn out the container 12.

Further, the nonaqueous electrolyte is injected into the container 12.

As the positive electrode, negative electrode, separator, nonaqueous electrolyte, container, and the like in the battery 10', the same ones as those mentioned in the battery 10 shown in FIGS. 3 and 4 may be used.

According to the above embodiment, a nonaqueous electrolyte battery having excellent rapid charge/discharge performance and a high energy density can be provided.

Third Embodiment

Next, a battery pack according to a third embodiment will be explained with reference to the drawings. The battery pack includes one or two or more of the above nonaqueous electrolyte batteries (unit cells) according to the second embodiment. When the battery pack includes two or more unit cells, these unit cells are disposed in such a manner that they are electrically connected in series or in parallel.

Figure 7:
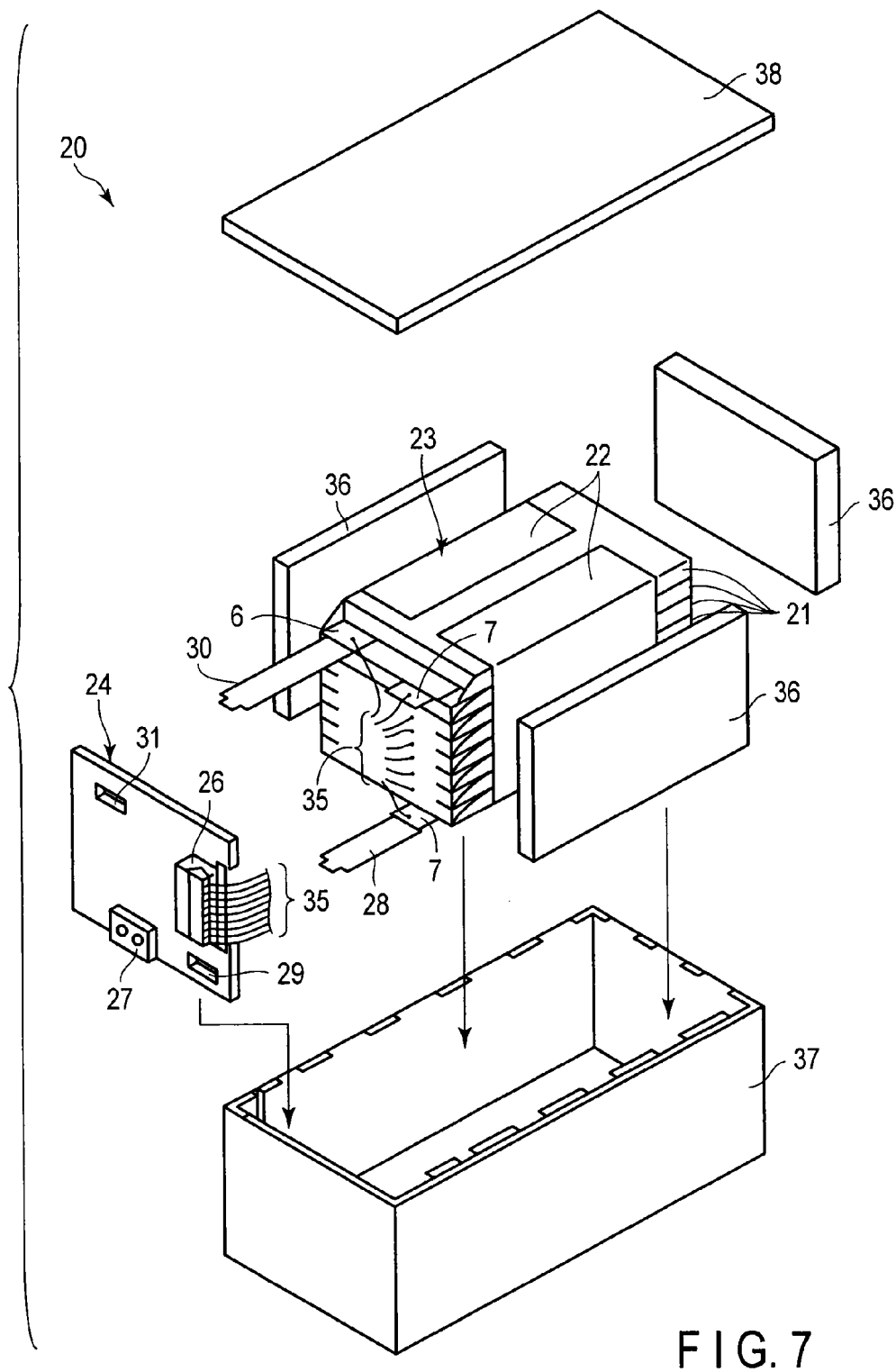
FIG. 7 is an exploded perspective view of a battery pack according to a third embodiment.
Figure 8:
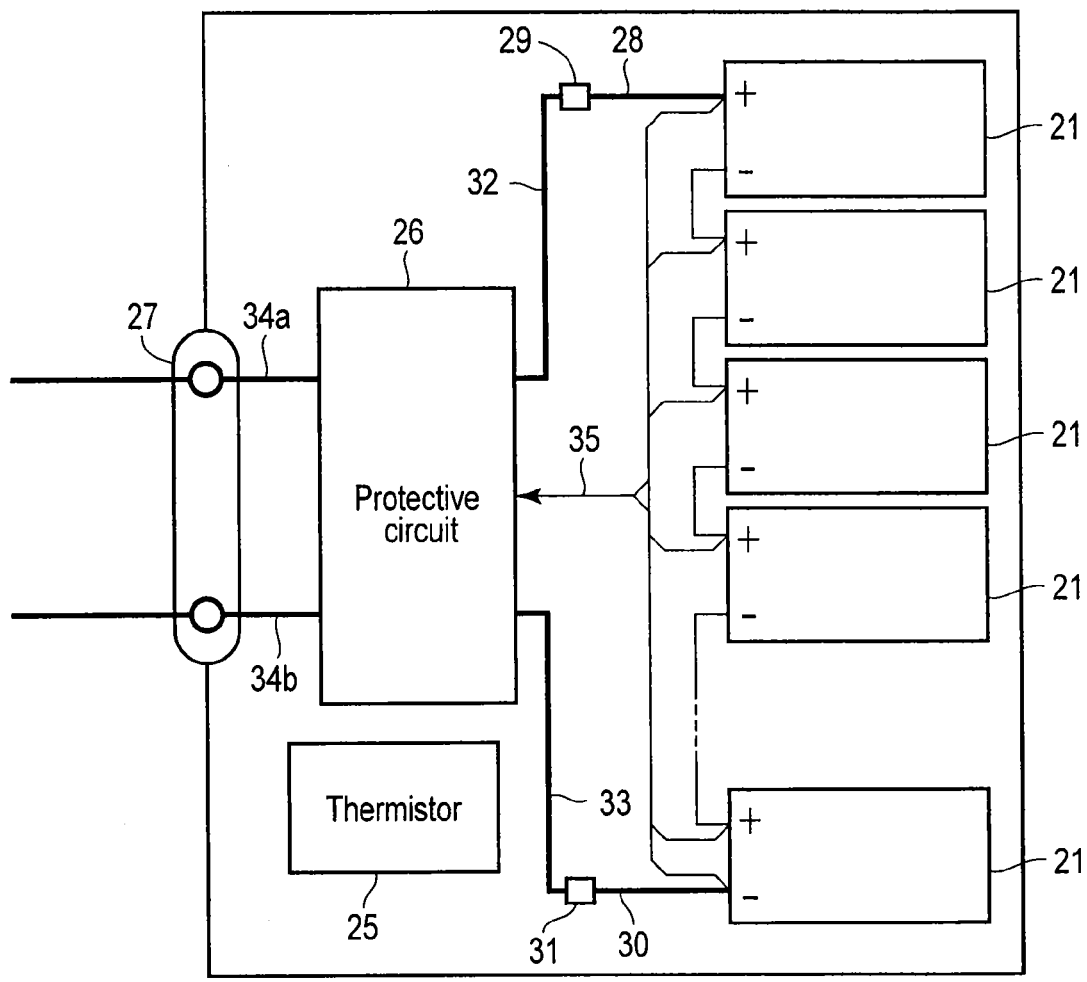
FIG. 8 is a block diagram showing an electric circuit of the battery pack of FIG. 7.

FIG. 7 and FIG. 8 show an example of a battery pack 20. This battery pack 20 includes one or more flat-type unit cells 21 having the structure shown in FIG. 3. FIG. 7 is an exploded perspective view of the battery pack 20. FIG. 8 is a block pattern showing the electric circuit of the battery pack 20 shown in FIG. 7.

A plurality of unit cells 21 are laminated such that the externally extended negative electrode terminals 6 and positive electrode terminals 7 are arranged in the same direction and fastened with an adhesive tape 22 to thereby constitute a battery module 23. These unit cells 21 are electrically connected in series as shown in FIG. 8.

A printed wiring board 24 is disposed opposite to the side surface of the unit cell 21 from which the negative electrode terminal 6 and positive electrode terminal 7 are extended. As shown in FIG. 8, a thermistor 25, a protective circuit 26 and an energizing terminal 27 connected to external devices are mounted on the printed wiring board 24. An insulating plate (not shown) is attached to the surface of the printed wiring board 24 facing the battery module 23 to avoid unnecessary connection with the wiring of the battery module 23.

A positive electrode side lead 28 is connected to the positive electrode terminal 7 positioned on the lowermost layer of the battery module 23 and one end of the positive electrode side lead 28 is inserted into and electrically connected to a positive electrode side connector 29 of the printed wiring board 24. A negative electrode side lead 30 is connected to the negative electrode terminal 6 positioned on the uppermost layer of the battery module 23 and one end of the negative electrode side lead 30 is inserted into and electrically connected to a negative electrode side connector 31 of the printed wiring board 24. These connectors 29 and 31 are connected to the protective circuit 26 through wirings 32 and 33 formed on the printed wiring board 24.

The thermistor 25 is used to detect the temperature of the unit cell 21 and the detected signals are transmitted to the protective circuit 26. The protective circuit 26 can shut off a plus side wiring 34a and minus side wiring 34b between the protective circuit 26 and the energizing terminal 27 connected to external devices in a predetermined condition. The predetermined condition means, for example, the case where the temperature detected by the thermistor 25 is a predetermined one or higher. Also, the predetermined condition means, for example, the case of detecting overcharge, overdischarge and over-current of the unit cell 21. The detections of this overcharge and the like are made for individual unit cells 21 or whole unit cells 21. When individual unit cells 21 are detected, either the voltage of the battery may be detected or the potential of the positive electrode or negative electrode may be detected. In the latter case, a lithium electrode used as a reference electrode is inserted between individual unit cells 21. In the case of FIG. 7 and FIG. 8, a wiring 35 for detecting voltage is connected to each unit cell 21 and the detected signals are transmitted to the protective circuit 26 through these wirings 35.

A protective sheet 36 made of a rubber or resin is disposed on each of the three side surfaces of the battery module 23 excluding the side surface from which the negative electrode terminal 6 and positive electrode terminal 7 are projected.

The battery module 23 is accommodated in a container 37 together with each protective sheet 36 and printed wiring board 24. Specifically, the protective sheet 36 is disposed on each inside surface in the direction of the long side and on one of the inside surfaces in the direction of the short side of the container 37, and the printed wiring board 24 is disposed on the other inside surface in the direction of the short side. The battery module 23 is positioned in a space enclosed by the protective sheet 36 and the printed wiring board 24. A lid 38 is attached to the upper surface of the container 37.

Here, a thermally contracting tape may be used in place of the adhesive tape 22 to secure the battery module 23. In this case, after the protective sheet is disposed on both sides of the battery module and the thermally contracting tubes are wound around the battery module; the thermally contracting tape is contracted by heating to fasten the battery module.

The structure in which the unit cells 21 are connected in series is shown in FIG. 7 and FIG. 8. However, these unit cells may be connected in parallel to increase the capacity of the battery. The assembled battery packs may be further connected in series or in parallel.

Also, the structure of the battery pack is appropriately changed according to its use. The battery pack is preferably used in applications exhibiting excellent cycle performances when a large current is extracted. Specific examples of these applications include power sources for digital cameras, and power sources mounted on vehicles such as two- to four-wheel vehicles hybrid electric cars, two- to four-wheel electric cars and assist bicycles. The battery pack is preferably used for power sources mounted on vehicles.

According to these embodiments, a battery pack which has excellent rapid charge/discharge performance and a high energy density can be provided.

EXAMPLES

The above embodiments will be explained in more detail by way of examples.

Synthetic Examples 1 to 9

A commercially available oxide reagent $Nb_2O_5$ and a $TiO_2$ powder were weighed such that the molar ratio of niobium to titanium was 0.50, 0.85, 1.07, 1.33, 1.90, 1.99, 2.01, 2.10, or 3.00, and mixed using a mortar. These mixtures were placed in an electric furnace to sinter them at 1250° C. for a total of 20 hours. Products of Synthetic Examples 1 to 9 were thus obtained. The synthetic method used here is based on M. Gasperin, Journal of Solid-State Chemistry 53, pp. 144-147 (1984).

(Powder X-Ray Diffractometry)

Each of the products according to Synthetic Examples 1 to 9 was subjected to XRD measurement. First, the product was ground into a powder until the average particle diameter of the powder was reduced to about 10 μm to prepare a sample. The obtained sample was filled in a 0.2 mm deep holder part formed on a glass sample plate. Then, a separate glass plate was pressed against the sample from the outside to flatten the surface of the filled sample. Then, the glass plate filled with the sample was set to a powder X-ray diffractometer to obtain a diffraction pattern by using Cu—Kα rays.

As a result, it was confirmed that all of the main crystal phases of the products according to Synthetic Examples 1 to 9 were a complex oxide ($Nb_2TiO_7$) containing niobium and titanium and all of these complex oxides had a monoclinic crystal structure. Further, it was confirmed that a second phase constituted of titanium dioxide existed in the products according to Synthetic Examples 1 to 5.

(Production of an Electrochemical Measuring Cell)

Each of the products according to Synthetic Examples 1 to 9 was used to manufacture an electrochemical measuring cell. First, acetylene black was blended as a conductive agent in the product in a ratio of 10 parts by mass based on the product. This mixture was dispersed in N-methyl-2-pyrrolidone (NMP). A polyvinylidene fluoride (PVdF) was added as a binder with the obtained dispersion solution in a ratio of 10 parts by mass based on the product to produce slurry for producing an electrode. This slurry was applied to each surface of a current collector made of an aluminum foil using a blade. Then, the slurry was dried at 130° C. under vacuum for 12 hours to obtain an electrode.

Using this electrode, a metal lithium foil as a counter electrode, and a nonaqueous electrolyte, an electrochemical measuring cell was produced. As a solvent for the nonaqueous electrolyte, a mixture solvent of ethylene carbonate and diethyl carbonate (ratio by vol was 1:1) was used. As the solute of the nonaqueous electrolyte, lithium hexafluorophosphate was used. The concentration of lithium hexafluorophosphate was 1 M.

(Electrochemical Measurement)

The first discharge capacity of each measuring cell according to Synthetic Examples 1 to 9 was measured. The charge/discharge test was performed in the potential range from 1.0 V to 3.0 V relative to metallic lithium electrode. The charge/discharge current rate was set to 0.2 C (hourly discharge rate). The test was performed at ambient temperature. The results are shown in Table 1.

Further, the discharge capacity retention of each measuring cell according to Synthetic Examples 1 to 9 after 30 cycles was measured. First, charge/discharge cycles of each measuring cell were performed for 30 cycles (one cycle includes one charge and one discharge). The charge/discharge operation was performed at ambient temperature at 1 C (hourly discharge rate) in a potential range from 1.0 V to 3.0 V relative to metallic lithium electrode. Next, the charge/discharge operation was performed at 0.2 C (hourly discharge rate) to measure the discharge capacity after 30 cycles. The discharge capacity retention (%) after 30 cycles was calculated when the initial discharge capacity measured at 0.2 C was set to 100. The results are shown in Table 1.

Further, the rapid charge/discharge performance (rate performance) of each measuring cell according to Synthetic Examples 1 to 5 was investigated. Each discharge capacity at 0.2 C, 1.0 C, and 5.0 C was measured. Then, the discharge capacity at 0.2 C was set to 100 to calculate each discharge capacity retention (%) at 1.0 C and 5.0 C. The results are shown in Table 1

Comparative Example 1

$Nb_2TiO_7$ was synthesized according to a conventionally known synthetic method. The synthesis was made in the same manner as in Example 3 described in JP-A No. 2010-287496, which provided the highest ratio performance among the products described in JP-A No. 2010-287496. Specifically, titanium oxide powder and niobium pentoxide powder were weighed such that the molar ratio of both powders was 1:1. These powders were wet-mixed using ethanol in a mortar. This mixture was put in a platinum crucible and heat-treated at 1300° C. A product of Comparative Example 1 was thus obtained.

The product of Comparative Example 1 was subjected to XRD measurement in the same manner as in the synthetic examples. As a result, the peaks in the XRD pattern all accorded with the peaks of $Nb_2TiO_7$.

An electrochemical measuring cell was produced using the product according to Comparative Example 1 in the same manner as in the synthetic examples. Then, electrochemical measurements were performed in the same manner as in the synthetic examples. The results are shown in Table 1.

Comparative Examples 2 to 4

Commercially available oxide reagents $Nb_2O_5$ powder and $TiO_2$ powder were weighed such that the molar ratio of niobium to titanium was 5.00, 14.00, or 24.00 and mixed using a mortar. These mixtures were placed in an electric furnace and sintered at 1250° C. for a total of 20 hours. Products according to Comparative Examples 2 to 4 were thus obtained.

Each product according to Comparative Examples 2 to 4 was subjected to XRD measurement in the same manner as in the synthetic examples. As a result, the crystal phases of the products according to Comparative Examples 2 to 4 were $Nb_{10}Ti_2O_{29}$, $Nb_{14}TiO_{37}$, and $Nb_{24}TiO_{62}$, respectively, and it was confirmed that all the products had monoclinic crystal structure.

Using the products according to Comparative Examples 2 to 4, electrochemical measuring cells were produced in the same manner as in synthetic examples. Then, electrochemical measurements were performed in the same manner as in the synthetic examples. The results are shown in Table 1.

TABLE 1

| | $M_{Nb}/M_{Ti}$ | Crystal phase | First discharge capacity at 0.2 C (mAh/g) | Discharge capacity retention after 30 cycles (%) | Discharge capacity retention at 1 C (%) | Discharge capacity retention at 5 C (%) |
|---|---|---|---|---|---|---|
| Synthetic Example 1 | 0.50 | $Nb_2TiO_7 + TiO_2$ | 180.3 | 91.3 | 91.6 | 85.3 |
| Synthetic Example 2 | 0.85 | $Nb_2TiO_7 + TiO_2$ | 207.9 | 89.1 | 92.8 | 89.1 |
| Synthetic Example 3 | 1.07 | $Nb_2TiO_7 + TiO_2$ | 234.8 | 87.5 | 93.2 | 92.2 |
| Synthetic Example 4 | 1.33 | $Nb_2TiO_7 + TiO_2$ | 239.0 | 90.8 | 96.8 | 94.6 |
| Synthetic Example 5 | 1.90 | $Nb_2TiO_7 + TiO_2$ | 260.8 | 90.2 | 97.2 | 94.5 |
| Synthetic Example 6 | 1.99 | $Nb_2TiO_7$ | 263.5 | 89.5 | 93.5 | 89.6 |
| Comparative Example 1 | 2.00 | $Nb_2TiO_7$ | 265.2 | 86.7 | 89.1 | 65.3 |
| Synthetic Example 7 | 2.01 | $Nb_2TiO_7$ | 270.5 | 88.5 | 94.4 | 92.3 |
| Synthetic Example 8 | 2.10 | $Nb_2TiO_7$ | 294.5 | 89.0 | 98.4 | 96.3 |
| Synthetic Example 9 | 3.00 | $Nb_2TiO_7$ | 295.4 | 87.1 | 96.6 | 95.5 |
| Comparative Example 2 | 5.00 | $Nb_{10}Ti_2O_{29}$ | 280.1 | 85.3 | 97.9 | 80.3 |
| Comparative Example 3 | 14.00 | $Nb_{14}TiO_{37}$ | 280.6 | 83.1 | 96.6 | 83.8 |
| Comparative Example 4 | 24.00 | $Nb_{24}TiO_{62}$ | 272.1 | 80.3 | 98.6 | 82.2 |

<Results>

As shown in Table 1, all of Synthetic Examples 1 to 9 had a higher 5-C discharge capacity retention than Comparative Examples 1 to 4. This showed that Synthetic Examples 1 to 9 each had excellent rapid charge/discharge performance. Further, Synthetic Examples 1 to 9 all had a higher discharge capacity retention after 30 cycles than each of Comparative Examples 1 to 4. It was therefore confirmed that all of Synthetic Examples 1 to 9 had a good stability during charge/discharge cycle test.

Comparative Examples 2 to 4 had relatively high 1 C-discharge capacity retention. It is inferred that in case of a rate of about 1 C, higher crystallinity is more advantageous. Generally, the higher the sintering temperature is, the higher the crystallinity is. In the synthetic examples and comparative examples, the same sintering temperature was used. However, the melting temperature of the product is decreased with increase in the content of niobium. It is therefore inferred that Comparative Examples 2 to 4 containing a large amount of niobium were respectively more improved in crystallinity than other examples. In case of a rate as high as about 5 C, on the other hand, the influence of the ratio of elements constituting a crystal is increased as mentioned above. It is therefore inferred that Synthetic Examples 1 to 9 have a higher 5-C discharge capacity retention than Comparative Examples 2 to 4.

Figure 9:
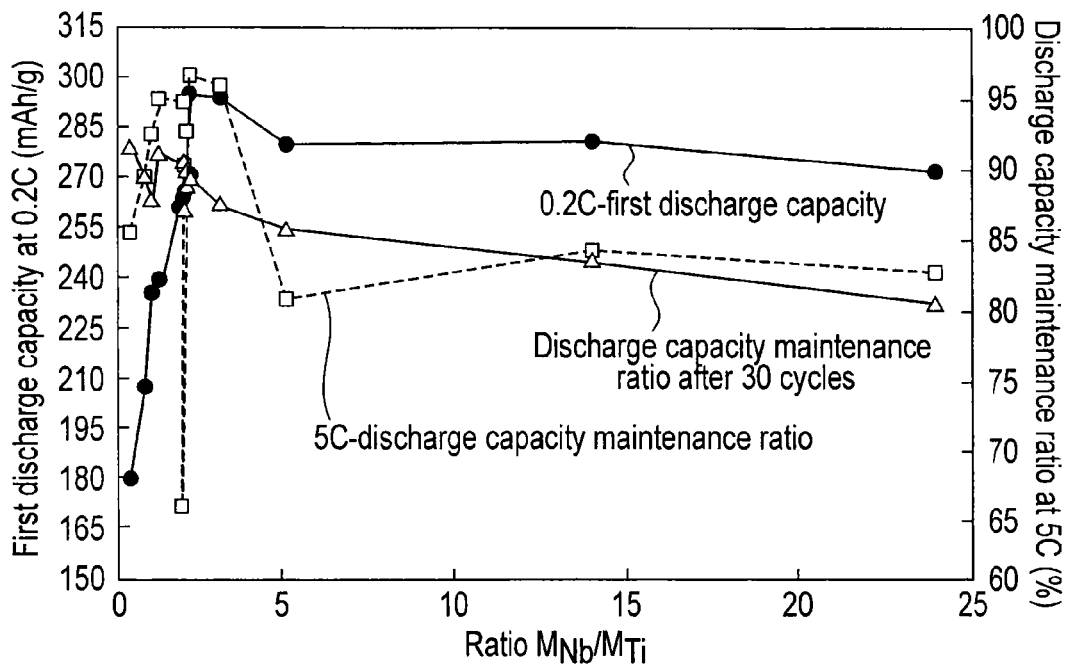
FIG. 9 is a graph showing the results of electrochemical measurement of a synthetic example and a comparative example.
Figure 10:
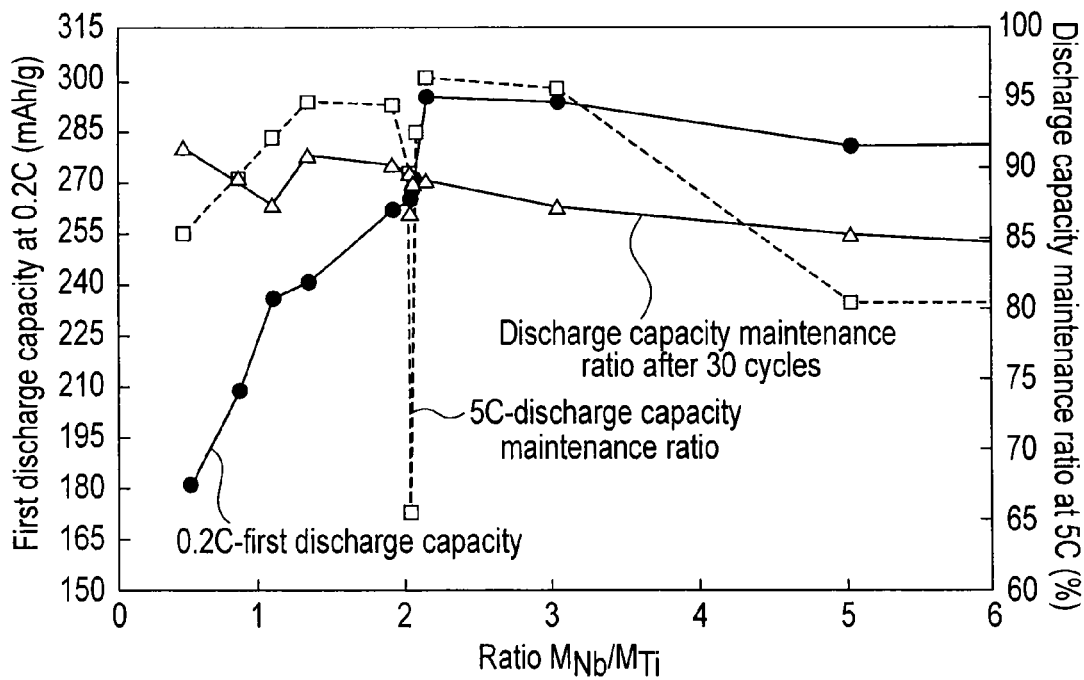
FIG. 10 is a graph obtained by enlarging a part of FIG. 9.

FIG. 9 shows a graph showing the relationship between 0.2 C-first discharge capacity, or discharge capacity retention after 30 cycles or 5 C-discharge capacity retention, and the ratio $M_{Nb}/M_{Ti}$, in each synthetic example and comparative example. FIG. 10 is an enlarged graph showing a part of FIG. 9.

As shown in FIGS. 9 and 10, Comparative Example 1 having a ratio $M_{Nb}/M_{Ti}$ of just 2 has a significantly low 5C-discharge capacity retention. However, it was shown that when the ratio $M_{Nb}/M_{Ti}$ was designed to be a value exceeding 2 or to be less than 2, the 5 C-discharge capacity retention was raised.

Further, when the $M_{Nb}/M_{Ti}$ was 3, the highest 0.2 C-first discharge capacity was obtained. It is inferred that the improvement of crystallinity and increase in the electronic conductivity obtained by a substitution of niobium for titanium sites were developed in a well-balanced manner.

When the $M_{Nb}/M_{Ti}$ was less than 2, the 5 C-discharge capacity retention was high, though the 0.2 C-discharge capacity was dropped. An active material having a ratio $M_{Nb}/M_{Ti}$ less than 2 contains a relatively small amount of niobium. Because niobium is expensive, such an active material has the advantage as a low cost material.

It was found that when the $M_{Nb}/M_{Ti}$ exceeded 5, the 0.2 C-first discharge capacity and the discharge capacity retention after 30 cycles and 5 C-discharge capacity retention ratio all tended to be dropped. Further, an active material having a ratio $M_{Nb}/M_{Ti}$ exceeding 5 contains a relatively large amount of niobium. Therefore, the cost of such an active material is increased.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An active material comprising a complex oxide comprising niobium and titanium, wherein a ratio $M_{Nb}/M_{Ti}$ of moles of niobium $M_{Nb}$ to moles of titanium $M_{Ti}$ in the active material satisfies equation (I)

$$0.5 \leq M_{Nb}/M_{Ti} < 2 \tag{I}$$

and wherein the complex oxide comprising niobium and titanium comprises a monoclinic crystal structure, has a symmetry of space group C2/m, and has a BET specific surface area of 0.1 m²/g or more and less than 100 m²/g.

2. The active material according to claim 1, wherein the ratio $M_{Nb}/M_{Ti}$ is 1.8 to 1.9.

3. The active material according to claim 1, wherein the ratio $M_{Nb}/M_{Ti}$ is 1.0 to 1.99.

4. The active material according to claim 1, wherein the complex oxide comprising niobium and titanium comprises a complex oxide represented by the formula $Li_xNb_yTiO_{\{(5y+4)/2\}+\delta}$, where x, y, and δ satisfy relationships represented by the following equations 0≤x≤9, 0.5≤y<2, and −0.5≤δ≤0.5, respectively.

5. The active material according to claim 4, comprising a first phase constituted of the complex oxide represented by the formula $Li_xNb_yTiO_{\{(5y+4)/2\}+\delta}$, and a second phase constituted of a titanium dioxide, where x, y, and δ satisfy relationships represented by the following equations 0≤x≤9, 0.5≤y<2, and −0.5≤δ≤0.5, respectively.

6. The active material according to claim 1, comprising a first phase constituted of the complex oxide comprising niobium and titanium, and a second phase constituted of a titanium dioxide.

7. The active material according to claim 6, wherein the complex oxide comprising niobium and titanium is represented by the formula $Li_xNb_yTiO_{\{(5y+4)/2\}+\delta}$, where x, y, and δ satisfy relationships represented by the following equations 0≤x≤9, 0.5≤y<2, and −0.5≤δ≤0.5, respectively.

8. The active material according to claim 1, wherein the complex oxide comprising niobium and titanium consists of a monoclinic crystal structure.

9. A nonaqueous electrolyte battery comprising:
a negative electrode comprising the active material according to claim 1;
a positive electrode; and
a nonaqueous electrolyte.

10. A nonaqueous electrolyte battery comprising:
a negative electrode comprising the active material according to claim 4;
a positive electrode; and
a nonaqueous electrolyte.

11. A nonaqueous electrolyte battery comprising:
negative electrode comprising the active material according to claim 6;
a positive electrode; and
a nonaqueous electrolyte.

12. A nonaqueous electrolyte battery comprising:
negative electrode comprising the active material according to claim 7;
a positive electrode; and
a nonaqueous electrolyte.

13. A nonaqueous electrolyte battery comprising:
negative electrode comprising the active material according to claim 5;
a positive electrode; and
a nonaqueous electrolyte.

14. A battery pack comprising:
the nonaqueous electrolyte battery according to claim 9; and
a container accommodating the battery.

15. A battery pack comprising:
the nonaqueous electrolyte battery according to claim 10; and
a container accommodating the battery.

16. A battery pack comprising:
the nonaqueous electrolyte battery according to claim 11; and
a container accommodating the battery.

17. A battery pack comprising:
the nonaqueous electrolyte battery according to claim 12; and
a container accommodating the battery.

18. A battery pack comprising:
the nonaqueous electrolyte battery according to claim 13; and
a container accommodating the battery.

* * * * *